J. E. Emerson.
Swage for Sharpening Saws.

No. 61,818.    Patented Feb. 5, 1867.

Witnesses.
F. A. Jackson.
Wm Truwin

Inventor:
James E. Emerson
Per Munn & Co.
Attorneys

United States Patent Office.

JAMES E. EMERSON, OF TRENTON, NEW JERSEY.

Letters Patent No. 61,818, dated February 5, 1867.

---

IMPROVEMENT IN SWAGES FOR SHARPENING SAWS.

---

The Schedule referred to in these Letters Patent and making part of the same.

---

TO ALL WHOM IT MAY CONCERN:

Be it known that I, JAMES E. EMERSON, of Trenton, in the county of Mercer, and State of New Jersey, have invented a new and improved Swage for Sharpening Saw Teeth; and I do hereby declare that the following is a full, clear, and exact description thereof, which will enable those skilled in the art to make and use the same, reference being had to the accompanying drawing, forming part of this specification, in which—

Figure 1:
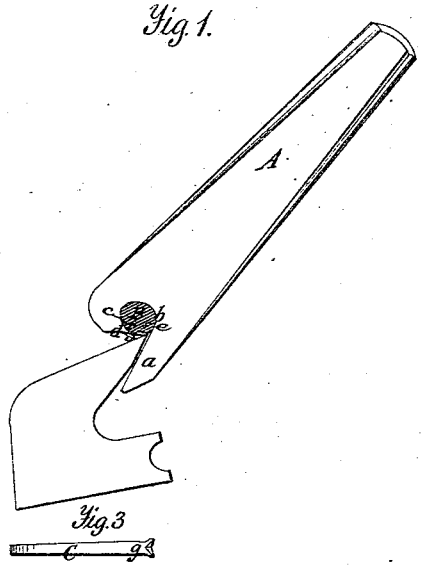
Figure 2:
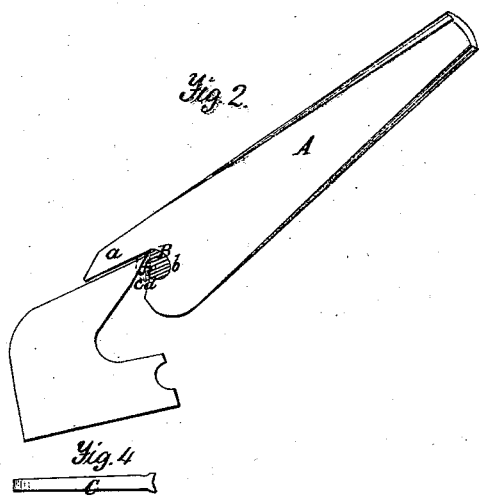
Figures 4, 6:
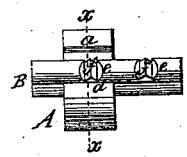

Figures 1 and 2 are side sectional views of my invention taken in the line $x\ x$, fig. 6.

Figures 3, 5:
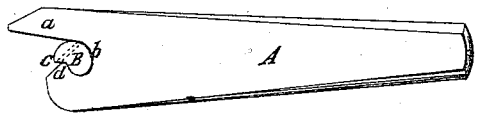

Figures 3 and 4 outer edge views of two saw teeth sharpened by my improvement.

Figure 5, a side view of my improvement; and

Figure 6, a front view of the same.

Similar letters of reference indicate corresponding parts.

This invention relates to a new and useful improvement on a swage, for which Letters Patent were granted to me bearing date 5th June, 1866.

The present invention consists in a modification of the die of the swage, as hereinafter fully shown and described, whereby the implement is adapted for forming and sharpening a tooth having a cutting edge of peculiar and improved form.

A represents the shank or body of the implement having a projecting lip, $a$, and a circular recess, $b$, to receive a cylindrical die, B, formed with a lip, $c$, to bear or rest against the end $d$ of the shank, as shown clearly in figs. 1, 2, and 5. The parts above referred to are substantially the same as shown and described in my patented swage previously alluded to. The die B has one or more recesses, $e$, made in it, the bottoms of which are formed with a central ridge or elevation, $f$, and the inner parts of these recesses are wider than the front parts. The die B, in this implement, like that in the patented one, is adjusted with the recess $e$, to be used in a proper relative position with the inner surface of the lip $a$, as the bottom of $e$ and the inner surface of $a$ form the swage. The implement is adjusted or applied to the saw tooth C, in the same way as the original device, and the central ridge or elevation $f$ causes the cutting edge of the teeth to be swaged in V-form, as shown in figs. 3 and 4, and with a bevel, $g$, either at the inner or outer edge of the tooth as may be desired. When the bevel is required on the outer edge of the tooth, as shown in fig. 3, the lip $a$ is adjusted to the inner edge of the saw tooth, as shown in fig. 1, and when the bevel is required at the inner edges of the tooth, as shown in fig. 4, the lip $a$ is adjusted to the outer edge of the tooth, as shown in fig. 2, and in case a bevel is required at both the upper and lower edges of the tooth, a ridge or projection similar to the ridge or projection $f$, on the bottom of the recess $e$, is made on the inner surface of the lip $a$. This V-form cutting edge may be formed with the greatest facility, as the ridge or projection $f$ forces out the metal from the centre outward in both directions, and under the force of quite a moderate blow, one which will properly shape and sharpen the tooth without upsetting the metal and shortening it.

Having thus described my invention, what I claim as new, and desire to secure by Letters Patent, is—

A swage for sharpening saw teeth provided with the adjustable die B, having one or more recesses $e$, formed with a central ridge $f$, substantially as described for the purpose specified.

The above specification of my invention signed by me this 22d day of August, 1866.

J. E. EMERSON.

Witnesses:
    JAS. A. SERVICE,
    WM. DEAN OVERELL.